United States Patent
Chang et al.

(10) Patent No.: US 10,602,086 B2
(45) Date of Patent: Mar. 24, 2020

(54) METHODS OF OPERATING IMAGE SENSORS

(71) Applicants: Seung-Hyuk Chang, Seongnam-si (KR); Yoon-Dong Park, Yongin-si (KR); Yong-Jei Lee, Seongnam-si (KR)

(72) Inventors: Seung-Hyuk Chang, Seongnam-si (KR); Yoon-Dong Park, Yongin-si (KR); Yong-Jei Lee, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/883,453

(22) Filed: Oct. 14, 2015

(65) Prior Publication Data

US 2016/0037094 A1 Feb. 4, 2016

Related U.S. Application Data

(62) Division of application No. 13/239,925, filed on Sep. 22, 2011, now abandoned.

(30) Foreign Application Priority Data

Dec. 21, 2010 (KR) .......................... 10-2010-0131147

(51) Int. Cl.
*H04N 5/351* (2011.01)
*H04N 5/225* (2006.01)
(Continued)

(52) U.S. Cl.
CPC ............ *H04N 5/351* (2013.01); *G01S 7/4811* (2013.01); *G01S 17/06* (2013.01); *H04N 5/2256* (2013.01);
(Continued)

(58) Field of Classification Search
CPC ............ H04N 13/0239; H04N 13/021; H04N 13/0055
See application file for complete search history.

(56) References Cited

U.S. PATENT DOCUMENTS 6,201,565 B1   3/2001   Balogh
7,510,289 B2   3/2009   Takekuma
(Continued)

FOREIGN PATENT DOCUMENTS

CN   1220807 A   6/1999
CN   1984766 A   6/2007
(Continued)

OTHER PUBLICATIONS

Office Action for corresponding Korean Application No. 10-2010-0131147 dated Aug. 4, 2016.
(Continued)

*Primary Examiner* — Shawn S An
(74) *Attorney, Agent, or Firm* — Harness, Dickey & Pierce, P.L.C.

(57) ABSTRACT

A method of operating a three-dimensional image sensor may include: obtaining position information of an object using light emitted by a light source module, the three-dimensional image sensor including the light source module having a light source and a lens; and adjusting a relative position of the light source to the lens based on the obtained position information of the object. A method of operating an image sensor may include: obtaining position information of an object using light emitted by a light source module, the image sensor including the light source module; and adjusting an emission angle of the light emitted by the light source module based on the obtained position information.

20 Claims, 8 Drawing Sheets

(51) Int. Cl.
*H04N 13/254* (2018.01)
*H04N 13/271* (2018.01)
*G01S 7/481* (2006.01)
*G01S 17/06* (2006.01)

(52) U.S. Cl.
CPC ......... *H04N 13/254* (2018.05); *H04N 13/271* (2018.05)

(56) References Cited

U.S. PATENT DOCUMENTS

| | | | |
|---|---|---|---|
| 8,242,973 B2 | 8/2012 | Tanaka et al. | |
| 8,496,575 B2* | 7/2013 | Doi .................... | A61B 1/00181 345/419 |
| 2001/0043335 A1* | 11/2001 | Norita ................ | G01B 11/2518 356/601 |
| 2005/0162639 A1 | 7/2005 | Stierle | |
| 2006/0017427 A1* | 1/2006 | Nash .................... | G01C 15/004 324/67 |
| 2006/0044815 A1 | 3/2006 | Takekuma | |
| 2006/0235753 A1* | 10/2006 | Kameyama ........ | B60H 1/00742 705/15 |
| 2007/0237363 A1* | 10/2007 | Hagio ..................... | G01S 17/36 382/106 |
| 2008/0174860 A1* | 7/2008 | Yelleswarapu ........ | G02B 21/14 359/370 |
| 2009/0055851 A1* | 2/2009 | Tanaka .................... | G11B 7/12 720/695 |
| 2010/0278030 A1 | 11/2010 | Tanaka et al. | |
| 2011/0032707 A1* | 2/2011 | Takashige ................ | F21V 5/04 362/277 |

FOREIGN PATENT DOCUMENTS

| | | |
|---|---|---|
| CN | 101466049 A | 6/2009 |
| JP | 2004198864 A | 7/2004 |
| JP | 2004333736 A | 11/2004 |
| JP | 2007-195020 A | 8/2007 |
| KR | 10-0825919 B1 | 4/2008 |
| WO | WO-2009059464 A1 | 5/2009 |

OTHER PUBLICATIONS

Office Action for corresponding Chinese Application No. 201110421183.0 dated Jun. 29, 2016.
Chinese Office Action dated Feb. 6, 2016, in Chinese patent application No. 201110421183.0, with English translation.
Chinese Office Action for Chinese Patent Application No. 201110421183.0 dated Dec. 12, 2014.
U.S. Office Action dated Sep. 7, 2017 issued in copending U.S. Appl. No. 13/239,925.
U.S. Office Action dated Mar. 30, 2018 issued in co-pending U.S. Appl. No. 13/239,925.
U.S. Office Action dated Aug. 9, 2018 issued in co-pending U.S. Appl. No. 13/239,925.
U.S. Office Action dated Mar. 1, 2019 issued in co-pending U.S. Appl. No. 13/239,925.

* cited by examiner

METHODS OF OPERATING IMAGE SENSORS

CROSS-REFERENCE TO RELATED APPLICATIONS

This U.S. non-provisional application is a divisional application of U.S. patent application Ser. No. 13/239,925, entitled "IMAGE SENSORS AND METHODS OF OPERATING THE SAME" and filed on Sep. 22, 2011, and claims the associated benefit under 35 U.S.C. § 121. Parent U.S. patent application Ser. No. 13/239,925 claimed priority under 35 U.S.C. § 119 to Korean Patent Application No. 10-2010-0131147, filed on Dec. 21, 2010, in the Korean Intellectual Property Office (KIPO). The entire contents of parent U.S. patent application Ser. No. 13/239,925 and priority Korean Patent Application No. 10-2010-0131147 are incorporated herein by reference.

BACKGROUND

1. Technical Field

Example embodiments relate to image sensors and method of operating the same.

2. Description of the Related Art

An image sensor is a photo-detection device that converts optical signals including image and/or distance (i.e., depth) information of an object into electrical signals. Various types of image sensors, such as charge-coupled device (CCD) image sensors, CMOS image sensors (CIS), etc., have been developed to provide high quality image information of the object. Recently, a three-dimensional (3D) image sensor is being researched and developed which provides depth information as well as two-dimensional image information.

The three-dimensional image sensor may obtain the depth information using infrared light or near-infrared light as a light source. In a conventional three-dimensional image sensor, light energy may be wasted since light is projected even on regions where an object of interest does not exist.

SUMMARY

According to example embodiments, a method of operating a three-dimensional image sensor includes measuring a distance of an object from the three-dimensional image sensor using light emitted by a light source module, and adjusting an emission angle of the light emitted by the light source module based on the measured distance. The three-dimensional image sensor includes the light source module.

According to example embodiments, the measuring includes emitting the light with desired emission angle at the light source module, and measuring the distance of the object from the three-dimensional image sensor by detecting a time-of-flight of the emitted light.

According to example embodiments, the adjusting decreases the emission angle of the light as the distance of the object from the three-dimensional image sensor increases.

According to example embodiments, the light source module includes a light source and a lens, and the adjusting adjusts an interval between the light source and the lens based on the measured distance.

According to example embodiments, the adjusting moves the light source or the lens such that a separation between the light source and the lens increases as the distance of the object from the three-dimensional image sensor increases.

According to example embodiments, the light source module includes a light source and a lens, and the adjusting adjusts a refractive index of the lens based on the measured distance.

According to example embodiments, the adjusting increases the refractive index of the lens as the distance of the object from the three-dimensional image sensor increases.

According to example embodiments, the light source module includes a light source and a lens, and the adjusting adjusts a curvature of the lens based on the measured distance.

According to example embodiments, the adjusting increases the curvature of the lens as the distance of the object from the three-dimensional image sensor increases.

According to example embodiments, the method further includes adjusting an amplitude of the light emitted by the light source module according to an increment or a decrement of the emission angle of the light.

According to example embodiments, the adjusting decreases the amplitude of the light as the emission angle of the light decreases.

According to example embodiments, a method of operating a three-dimensional image sensor includes obtaining position information of an object using light emitted by a light source module, and adjusting a relative position of the light source to the lens based on the obtained position information of the object. The three-dimensional image sensor includes the light source module having a light source and a lens.

According to example embodiments, the position information of the object includes at least one of a distance of the object from the three-dimensional image sensor, a horizontal position of the object, a vertical position of the object and a size of the object.

According to example embodiments, the relative position of the light source to the lens includes at least one of an interval between the light source and the lens, a horizontal position of the light source and a vertical position of the light source.

According to example embodiments, the position information of the object includes a horizontal position and a vertical position of the object, and the adjusting moves the light source or the lens such that the object, the lens and the light source are positioned in a straight line.

According to example embodiments, a method of operating an image sensor includes obtaining position information of an object using light emitted by a light source module, and adjusting an emission angle of the light emitted by the light source module based on the obtained position information. The image sensor includes the light source.

According to example embodiments, the obtaining the position information of the object includes emitting the light with a desired emission angle from the light source module; and measuring a distance of the object from the image sensor by detecting a time-of-flight of the emitted light.

According to example embodiments, the adjusting adjusts the emission angle of the light based on the distance of the object from the image sensor.

According to example embodiments, the adjusting adjusts the emission angle of the light by adjusting a separation between a light source and a lens based on the measured distance. The light source module includes the light source and the lens.

According to example embodiments, the adjusting adjusts the emission angle of the light by adjusting a refractive index of a lens included in the light source module based on the measured distance.

According to example embodiments, the adjusting adjusts the emission angle of the light by adjusting a curvature of the lens based on the measured distance.

According to example embodiments, the method further includes adjusting an amplitude of the light emitted by the light source module according to an increase or a decrease in the emission angle of the light.

According to example embodiments, the measuring at least twice samples light reflected from the object, calculates a phase difference between the emitted and reflected light based on the at least two samples and detects the time-of-flight of the emitted light.

According to example embodiments, an image sensor includes a light source module configured to transmit light to an object, a pixel array configured to receive light reflected from the object, and a controller configured to obtain position information of the object based on the received light and to adjust an emission angle of the light transmitted by the light source module based on the obtained position information.

According to example embodiments, the controller is configured to obtain a distance of the object from the image sensor as the position information and to adjust the emission angle of the transmitted light based on the distance.

According to example embodiments, the controller is further configured to obtain the distance of the object from the image sensor by at least twice sampling the light reflected from the object, calculating a phase difference between the transmitted and reflected light based on the at least two samples and detecting a time-of-flight of the light.

According to example embodiments, the light source module includes a light source and a lens, and the controller is configured to adjust the emission angle of the transmitted light by adjusting a separation between the lens and the light source based on the obtained distance.

According to example embodiments, the light source module includes a light source and a lens, and the controller is configured to adjust the emission angle of the transmitted light by adjusting a refractive index of the lens based on the obtained distance.

According to example embodiments, the light source module includes a light source and a lens, and the controller is configured to adjust the emission angle of the transmitted light by adjusting a curvature of the lens based on the obtained distance.

According to example embodiments, the controller is configured to adjust an amplitude of the light transmitted by the light source module according to the adjustment of the emission light.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE EMBODIMENTS

Figure 1:
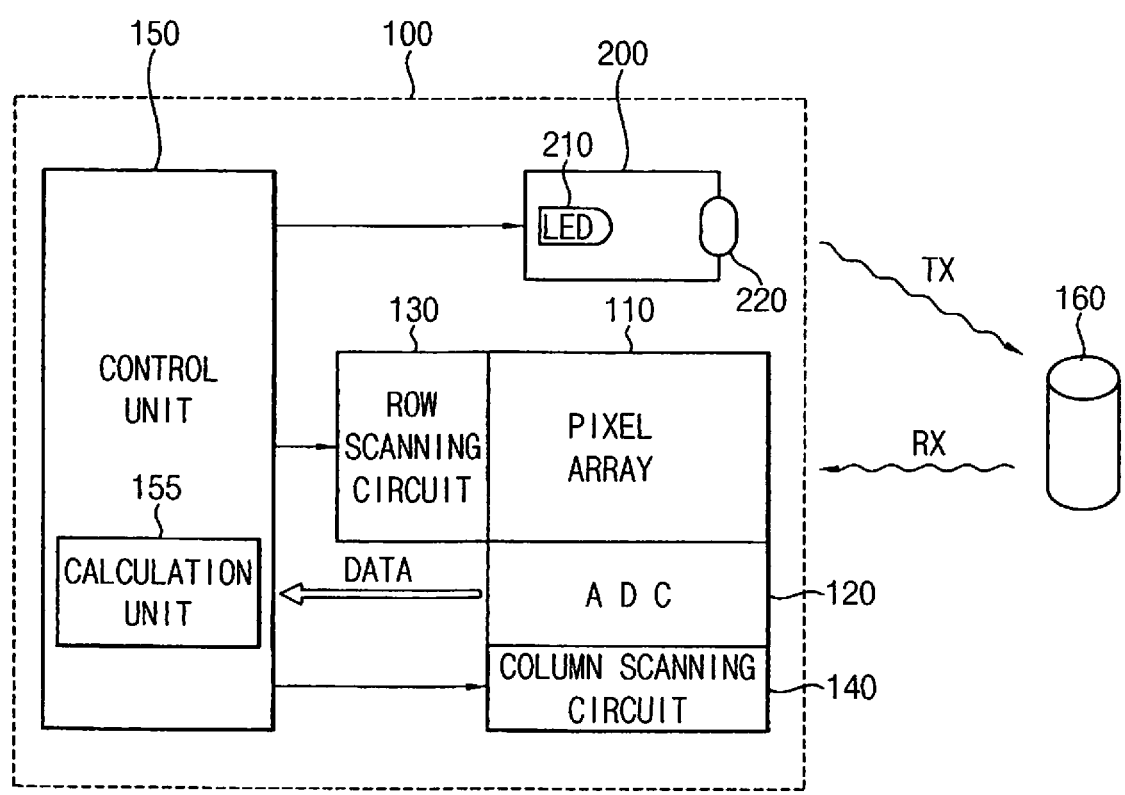
FIG. 1 is a block diagram illustrating a three-dimensional image sensor according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a three-dimensional image sensor according to example embodiments.

Referring to FIG. 1, a three-dimensional image sensor 100 includes a pixel array 110, an analog-to-digital conversion (ADC) unit 120, a row scanning circuit 130, a column scanning circuit 140, a control unit 150 and a light source module 200.

The pixel array 110 may include depth pixels receiving light RX that is reflected from an object 160 after being transmitted to the object 160 by the light source module 200. The depth pixels may convert the received light RX into electrical signals. The depth pixels may provide information about a distance of the object 160 from the three-dimensional image sensor 100 and/or black-and-white image information.

The pixel array 110 may further include color pixels for providing color image information. In this case, the three-dimensional image sensor 100 may be a three-dimensional color image sensor that provides the color image information and the depth information. According to example embodiments an infrared filter and/or a near-infrared filter may be formed on the depth pixels, and a color filter (e.g., red, green and blue filters) may be formed on the color pixels. According to example embodiments, a ratio of the number of the depth pixels to the number of the color pixels may vary as desired.

The ADC unit 120 may convert an analog signal output from the pixel array 110 into a digital signal. According to example embodiments, the ADC unit 120 may perform a column analog-to-digital conversion that converts analog signals in parallel using a plurality of analog-to-digital converters respectively coupled to a plurality of column lines. According to example embodiments, the ADC unit 120 may perform a single analog-to-digital conversion that sequentially converts the analog signals using a single analog-to-digital converter.

According to example embodiments, the ADC unit 120 may further include a correlated double sampling (CDS) unit for extracting an effective signal component. According to example embodiments, the CDS unit may perform an analog double sampling that extracts the effective signal component based on a difference between an analog reset signal including a reset component and an analog data signal including a signal component. According to example embodiments, the CDS unit may perform a digital double sampling that converts the analog reset signal and the analog data signal into two digital signals and extracts the effective signal component based on a difference between the two digital signals. According to example embodiments, the CDS unit may perform a dual correlated double sampling that performs both the analog double sampling and the digital double sampling.

The row scanning circuit 130 may receive control signals from the control unit 150, and may control a row address and a row scan of the pixel array 110. To select a row line among a plurality of row lines, the row scanning circuit 130 may apply a signal for activating the selected row line to the pixel array 110. According to example embodiments, the row scanning circuit 130 may include a row decoder that selects a row line of the pixel array 110 and a row driver that applies a signal for activating the selected row line.

The column scanning circuit 140 may receive control signals from the control unit 150, and may control a column address and a column scan of the pixel array 110. The column scanning circuit 140 may output a digital output signal from the ADC unit 120 to a digital signal processing circuit (not shown) and/or to an external host (not shown). For example, the column scanning circuit 140 may provide the ADC unit 120 with a horizontal scan control signal to sequentially select a plurality of analog-to-digital converters included in the ADC unit 120. According to example embodiments, the column scanning circuit 140 may include a column decoder that selects one of the plurality of analog-to-digital converters and a column driver that applies an output of the selected analog-to-digital converter to a horizontal transmission line. The horizontal transmission line may have a bit width corresponding to that of the digital output signal.

The control unit 150 may control the ADC unit 120, the row scanning circuit 130, the column scanning circuit 140 and the light source module 200. The control unit 150 may provide the ADC unit 120, the row scanning circuit 130, the column scanning circuit 140 and the light source module 200 with control signals, such as a clock signal, a timing control signal, or the like. According to example embodiments the control unit 150 may include a control logic circuit, a phase locked loop circuit, a timing control circuit, a communication interface circuit, or the like.

The light source module 200 may emit light of a desired (or, alternatively predetermined) wavelength. For example, the light source module 200 may emit infrared light and/or near-infrared light. The light source module 200 may include a light source 210 and a lens 220. The light source 210 may be controlled by the control unit 150 to emit the light TX of a desired intensity and/or characteristic (for example, periodic). For example, the intensity and/or characteristic of the light TX may be controlled such that the light TX has a waveform of a pulse wave, a sine wave, a cosine wave, or the like. The light source 210 may be implemented by a light emitting diode (LED), a laser diode, or the like. The lens 220 may be configured to adjust an emission angle (or an angle of transmission) of the light TX output from the light source 210. For example, an interval between the light source 210 and the lens 220 may be controlled by the control unit 150 to adjust the emission angle of the light TX.

Hereinafter, an operation of the three-dimensional image sensor 100 according to example embodiments will be described below.

The control unit 150 may control the light source module 200 to emit the light TX having the periodic intensity. The light TX emitted by the light source module 200 may be reflected from the object 160 back to the three-dimensional image sensor 100 as the received light RX. The received light RX may be incident on the depth pixels, and the depth pixels may be activated by the row scanning circuit 130 to output analog signals corresponding to the received light RX. The ADC unit 120 may convert the analog signals output from the depth pixels into digital data DATA. The digital data DATA may be provided to the control unit 150 by the column scanning circuit 140 and/or the ADC 120.

A calculation unit 155 included in the control unit 150 may calculate a distance of the object 160 from the three-dimensional image sensor 100, a horizontal position of the object 160, a vertical position of the object 160 and/or a size of the object 160 based on the digital data DATA. The control unit 150 may control the emission angle or a projection (or incident) region of the light TX based on the distance, the horizontal position, the vertical position and/or the size of the object 160. For example, the control unit 150 may control an interval between the light source 210 and the lens 220, a relative position (or, a placement) of the light source 210 and the lens 220 with respect to each other, a refractive index of the lens 220, a curvature of the lens 220, or the like. Accordingly, the light TX emitted by the light source module 200 may be focused on a region where the object 160 of interest is located, thereby improving the accuracy of the depth information provided from the depth pixels. Further, the control unit 150 may adjust an amplitude of the light TX (or the maximum intensity of the light TX during each period) according to a decrement or an increment of the emission angle of the light TX or according to a size of a region on which the light TX is projected (or incident). For example, the control unit 150 may decrease the amplitude of the light TX as the emission angle of the light TX decreases. As a result, in the three-dimensional image sensor 100 according to example embodiments, the power consumption may be reduced.

The digital data DATA and/or the depth information may be provided to the digital signal processing circuit and/or the external host. According to example embodiments, the pixel array 110 may include color pixels, and the color image information as well as the depth information may be provided to the digital signal processing circuit and/or the external host.

As described above, in the three-dimensional image sensor 100 according to example embodiments, since the light TX emitted by the light source module 200 is focused on the object 160 of interest, the accuracy of the depth information may be improved, and the power consumption may be reduced.

Figure 2:
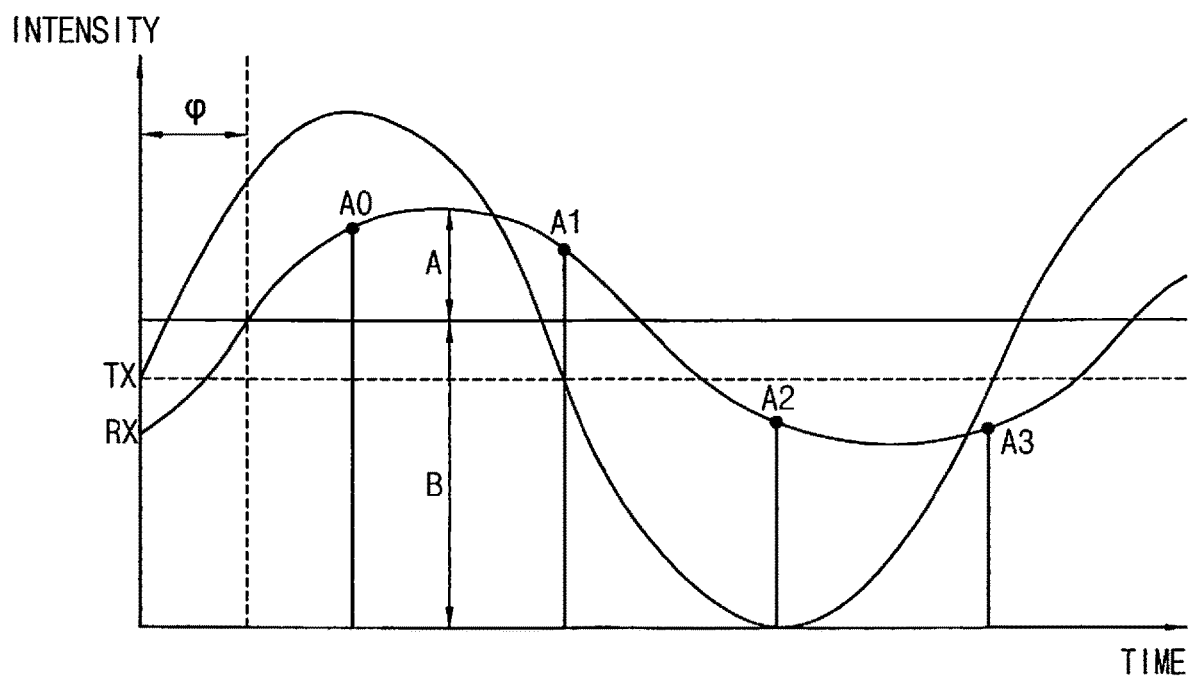
FIG. 2 is a diagram for describing an example of calculating a distance of an object by a three-dimensional image sensor of FIG. 1.

FIG. 2 is a diagram for describing an example of calculating a distance of an object by a three-dimensional image sensor of FIG. 1.

Referring to FIGS. 1 and 2, light TX emitted by a light source module 200 may have a periodic intensity and/or characteristic. For example, the intensity (for example, the number of photons per unit area) of the light TX may have a waveform of a sine wave.

The light TX emitted by the light source module 200 may be reflected from the object 160, and then may be incident on the pixel array 110 as received light RX. The pixel array 100 may periodically sample the received light RX. According to example embodiments, during each period of the received light RX (for example, corresponding to a period of the transmitted light TX), the pixel array 100 may perform a sampling on the received light RX by sampling, for example, at two sampling points having a phase difference of about 180 degrees, at four sampling points having a phase difference of about 90 degrees, or at more than four sampling points. For example, the pixel array 110 may extract four samples A0, A1, A2 and A3 of the received light RX at phases of about 90 degrees, about 180 degrees, about 270 degrees and about 360 degrees per period, respectively.

The received light RX may have an offset B that is different from an offset of the light TX emitted by the light source module 200 due to background light, a noise, or the like. The offset B of the received light RX may be calculated by Equation 1.

$$B = \frac{A0 + A1 + A2 + A3}{4} \quad \text{[Equation 1]}$$

Here, A0 represents an intensity of the received light RX sampled at a phase of about 90 degrees of the emitted light TX, A1 represents an intensity of the received light RX sampled at a phase of about 180 degrees of the emitted light TX, A2 represents an intensity of the received light RX sampled at a phase of about 270 degrees of the emitted light TX, and A3 represents an intensity of the received light RX sampled at a phase of about 360 degrees of the emitted light TX.

The received light RX may have an amplitude A lower than that of the light TX emitted by the light source module 200 due to loss (for example, light loss). The amplitude A of the received light RX may be calculated by Equation 2.

$$A = \frac{\sqrt{(A0 - A2)^2 + (A1 - A3)^2}}{2} \quad \text{[Equation 2]}$$

Black-and-white image information about the object 160 may be provided by respective depth pixels included in the pixel array 110 based on the amplitude A of the received light RX.

The received light RX may be delayed by a phase difference Φ corresponding, for example, to a double of the distance of the object 160 from the three-dimensional image sensor 100 with respect to the emitted light TX. The phase difference Φ between the emitted light TX and the received light RX may be calculated by Equation 3.

$$\phi = \arctan\left(\frac{A0 - A2}{A1 - A3}\right) \quad \text{[Equation 3]}$$

The phase difference Φ between the emitted light TX and the received light RX may, for example, correspond to a time-of-flight (TOF). The distance of the object 160 from the three-dimensional image sensor 100 may be calculated by an equation, "R=c*TOF/2", where R represents the distance of the object 160, and c represents the speed of light. Further, the distance of the object 160 from the three-dimensional image sensor 100 may also be calculated by Equation 4 using the phase difference Φ between the emitted light TX and the received light RX.

$$R = \frac{c}{4\pi f}\phi \quad \text{[Equation 4]}$$

Here, f represents a modulation frequency, which is a frequency of the intensity of the emitted light TX (or a frequency of the intensity of the received light RX).

This calculation of the distance may be performed with respect to each depth pixel included in the pixel array 110. For example, a calculation unit 155 may perform the calculation on respective digital data DATA corresponding to the respective depth pixels to generate a plurality of distance values of a plurality of portions in an image frame. That is, each distance value may be calculated based on a signal output from one depth pixel, and may be a distance value of one portion (or one point) in the image frame. Further, the calculation unit 155 may distinguish the object 160 of interest from a background image in the image frame based on the distance values. For example, the calculation unit 155 may detect the object 160 of interest such that the calculation unit 155 may determine portions of the image frame having relatively high distance values as the object 160 of interest. Thus, the calculation unit 155 may generate depth information about the object 160 of interest by generating the distance values and by detecting the object 160 of interest.

In some embodiments, the calculation unit 155 may further calculate a horizontal/vertical position of the object 160 of interest based on the distance values. For example, the calculation unit 155 may measure a relative position of the object 160 of interest from the center in the image frame, and may adjust the relative position using the distance information about the object 160 of interest to generate the horizontal/vertical position of the object 160 of interest.

In some embodiments, the calculation unit 155 may further calculate a size of the object 160 of interest based on the distance values. For example, the calculation unit 155 may measure a size of the object 160 of interest in the image frame, and may adjust the measured size of the object 160 of interest using the distance information about the object 160 of interest to generate the size of the object 160 of interest.

As described above, the three-dimensional image sensor 100 according to example embodiments may obtain depth information about the object 160 using the light TX emitted by the light source module 200. Although FIG. 2 illustrates the light TX of which the intensity has a waveform of a sine wave, the three-dimensional image sensor 100 may use the light TX of which the intensity has various types of waveforms, according to example embodiments. Further, the three-dimensional image sensor 100 may extract the depth information according to the waveform of the intensity of the light TX, a structure of a depth pixel, or the like.

Figure 3:
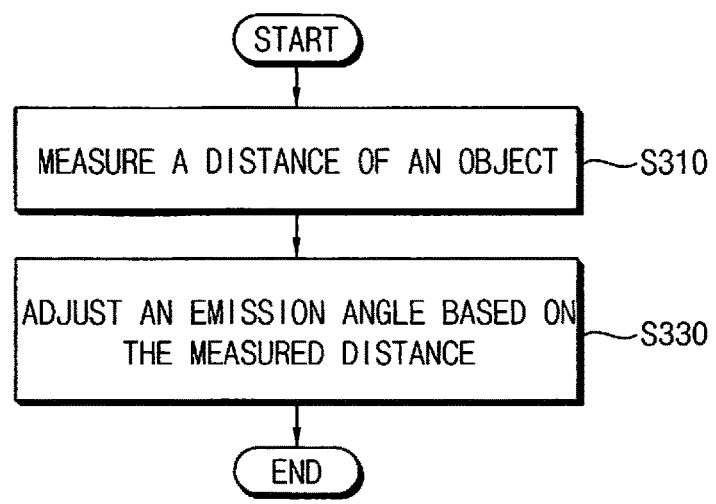
FIG. 3 is a flow chart illustrating a method of operating a three-dimensional image sensor according to example embodiments.
Figure 4:
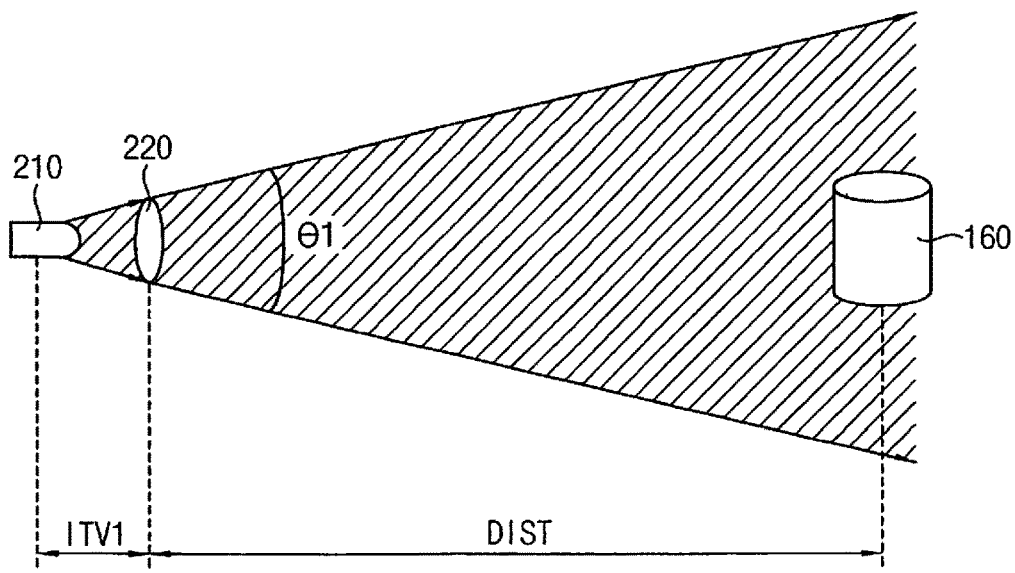
FIG. 4 is a diagram for describing an example of measuring a distance of an object according to the method of FIG. 3.
Figure 5A:
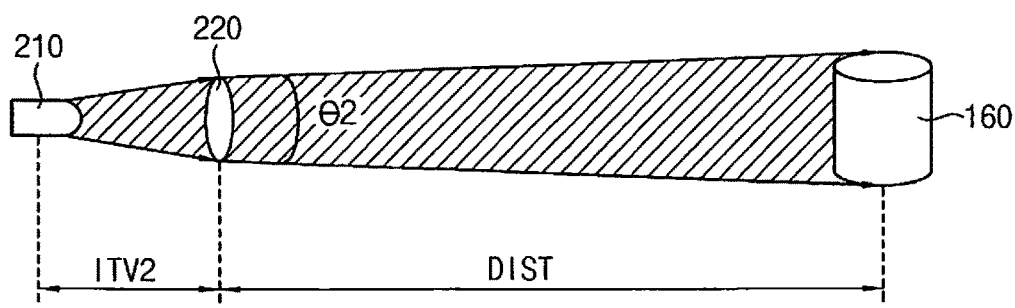
FIGS. 5A and 5B are diagrams for describing examples of adjusting an emission angle of light according to the method of FIG. 3.
Figure 5B:
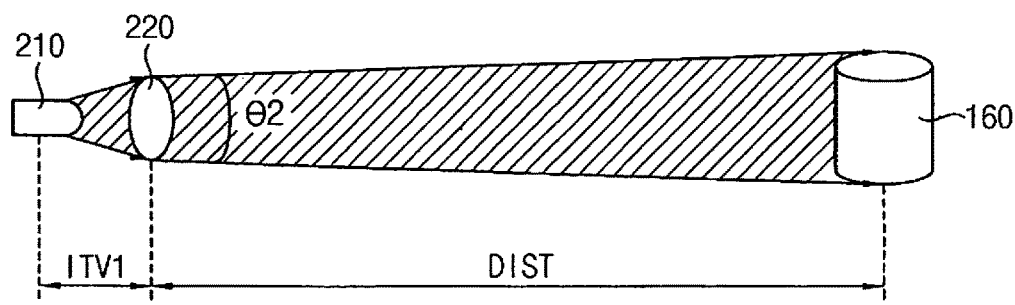

FIG. 3 is a flow chart illustrating a method of operating a three-dimensional image sensor, according to example embodiments. FIG. 4 is a diagram for describing an example of measuring a distance of an object according to the method of FIG. 3. FIGS. 5A and 5B are diagrams for describing examples of adjusting an emission angle of light according to the method of FIG. 3.

Referring to FIGS. 1, 3, 4, 5A and 5B, a three-dimensional image sensor 100 measures a distance DIST of an object 160 from the three-dimensional image sensor 100 using light TX emitted by a light source module 200 (S310). The light TX generated by a light source 210 may be emitted through a lens 220. If the light source 210 and the lens 220 have a first interval ITV1, the emitted light TX may have a first emission angle θ1. According to example embodiments, the first emission angle θ1 may be the maximum emission angle of the light TX emitted by the light source module 200. The three-dimensional image sensor 100 may measure the distance DIST of the object 160 from the three-dimensional image sensor 100 by detecting the light RX reflected from the object 160 to the three-dimensional image sensor 100.

The three-dimensional image sensor 100 adjusts the emission angle of the light TX emitted by the light source module 200 based on the distance DIST of the object 160 (S330). According to example embodiments, as illustrated in FIG. 5A, the three-dimensional image sensor 100 may adjust the interval between (or, the separation) the light source 210 and the lens 220 to a second interval ITV2 so that the light TX emitted by the light source module 200 has a second emission angle θ2. For example, a control unit 150 may control the light source module 200 to decrease the emission angle of the light TX as the distance DIST of the object 160 increases. According to example embodiments, the control unit 150 may move the light source 210 such that the interval between the light source 210 and the lens 220 increases as the distance DIST of the object 160 increases. According to example embodiments, the control unit 150 may move the lens 220 such that the interval between the light source 210 and the lens 220 increases as the distance DIST of the object 160 increases.

According to example embodiments, as illustrated in FIG. 5B, the three-dimensional image sensor 100 may adjust a curvature of the lens 220 so that the light TX emitted by the light source module 200 has the second emission angle θ2. For example, the control unit 150 may increase the curvature of the lens 220 (i.e. decrease a radius of curvature of the lens 220) as the distance DIST of the object 160 increases.

According to example embodiments, as illustrated in FIG. 5B, the three-dimensional image sensor 100 may adjust a refractive index of the lens 220 so that the light TX emitted by the light source module 200 has the second emission angle θ2. For example, the control unit 150 may increase the refractive index of the lens 220 as the distance DIST of the object 160 increases. According to example embodiments, the three-dimensional image sensor 100 may adjust any one or two or all of the interval between the light source 210 and lens 220, a curvature of the lens 220 and a refractive index of the lens 220.

In the method of operating the three-dimensional image sensor 100 according to example embodiments, since the emission angle of the light TX emitted by the light source module 200 is adjusted corresponding to the distance DIST of the object 160, light energy projected on the object 160 may be increased even with less power consumption, and the accuracy of depth information obtained by the three-dimensional image sensor 100 may be improved.

Further, in example embodiments, the three-dimensional image sensor 100 may emit the light TX with the maximum amplitude before adjusting the emission angle of the light TX, and may decrease the amplitude of the light TX according to a decrement of the emission angle of the light TX. Accordingly, the power consumed by the light source module 200 may be reduced. However, an operation, wherein light TX is initially emitted with minimum amplitude and the amplitude is later maximized depending on the emission angle of light TX, is also possible.

Figure 6:
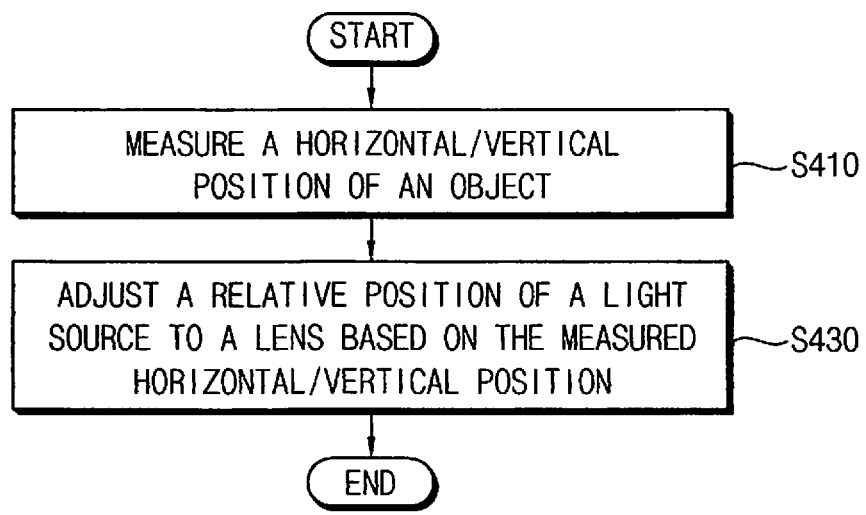
FIG. 6 is a flow chart illustrating a method of operating a three-dimensional image sensor according to example embodiments.
Figure 7:
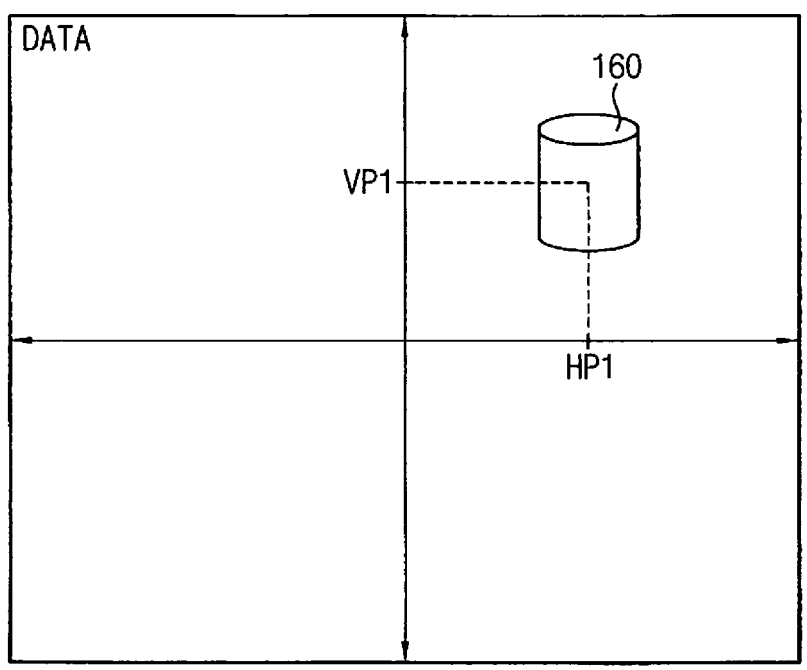
FIG. 7 is a diagram for describing an example of measuring a horizontal position and a vertical position of an object according to the method of FIG. 6.
Figure 8:
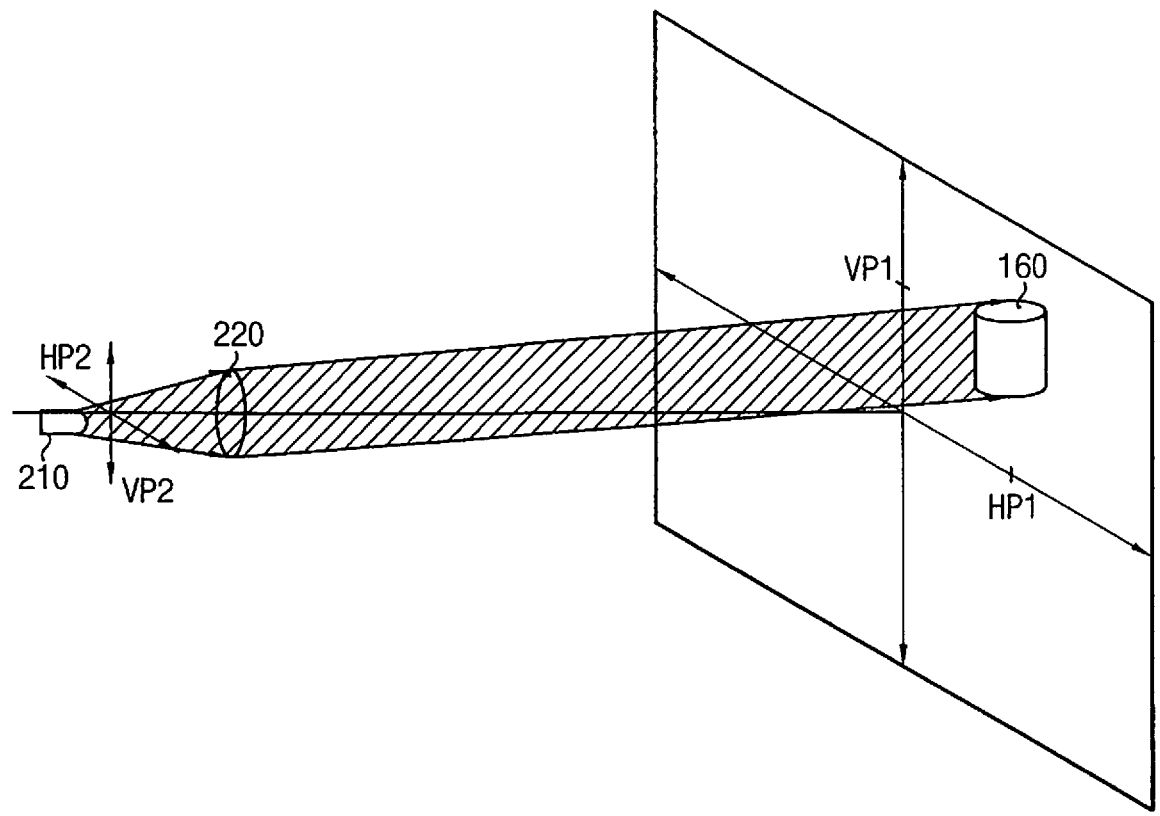
FIG. 8 is a diagram for describing examples of adjusting a relative position of a light source to a lens according to the method of FIG. 6.

FIG. 6 is a flow chart illustrating a method of operating a three-dimensional image sensor, according to example embodiments. FIG. 7 is a diagram for describing an example of measuring a horizontal position and a vertical position of an object according to the method of FIG. 6. FIG. 8 is a diagram for describing examples of adjusting a relative position (or, alternatively a placement) of a light source to a lens according to the method of FIG. 6.

Referring to FIGS. 1, 6, 7 and 8, a three-dimensional image sensor 100 measures a horizontal position HP1 and/or a vertical position VP1 of an object 160 using light TX emitted by a light source module 200 (S410). For example, the object 160 may be placed at a distance HP1 in a positive horizontal direction and/or a distance VP1 in a positive vertical direction from a straight line connecting the center of a light source 210 and the center of a lens 220. This straight line may be assumed to pass vertically through the plane of the paper and through the point of intersection of the horizontal and vertical axes shown in FIG. 7. The light TX emitted by the light source module 200 may be reflected from the object 160 to the three-dimensional image sensor 100. The received light RX may be converted into data DATA by depth pixels included in a pixel array 110 and an ADC unit 120, and a control unit 150 may measure the horizontal position HP1 and/or the vertical position VP1 of the object 160 based on the data DATA.

The three-dimensional image sensor 100 adjusts a relative position (or, the placement) of the light source 210 to the lens 220 based on the horizontal position HP1 and/or the vertical position VP1 of the object 160 (S430). According to example embodiments, as illustrated in FIG. 8, the control unit 150 may move the light source 210 by a desired (or, alternatively predetermined) distance HP2 in a negative horizontal direction and/or by a desired (or, alternatively predetermined) distance VP2 in a negative vertical direction based on the positive horizontal position HP1 and/or the positive vertical position VP1 of the object 160. For example, a ratio of the adjusted horizontal position HP2 of the light source 210 to the measured horizontal position HP1 of the object 160 may correspond to a ratio of a distance of the light source 210 from the lens 220 to a distance of the object 160 from the lens 220, and a ratio of the adjusted vertical position VP2 of the light source 210 to the measured vertical position VP1 of the object 160 may correspond to the ratio of the distance of the light source 210 from the lens 220 to the distance of the object 160 from the lens 220.

According to example embodiments, the control unit 150 may move the lens 220 by a desired (or, alternatively predetermined) distance in a positive horizontal direction and/or by a desired (or, alternatively predetermined) distance VP2 in a positive vertical direction based on the positive horizontal position HP1 and/or the positive vertical position VP1 of the object 160.

According to example embodiments, the control unit 150 may move the light source 210 or the lens 220 in a horizontal direction and/or a vertical direction based on the horizontal position HP1 and/or the vertical position VP1 of the object 160 so that the light source 210, the lens 220 and the object 160 are positioned in a straight line.

Further, the control unit 150 may adjust an emission angle of the light TX emitted by the light source module 200 according to a distance of the object 160 from the three-dimensional image sensor 110 and/or a size of the object 160, and may adjust (for example, decrease) an amplitude of the emitted light TX.

As described above, in the method of operating the three-dimensional image sensor 100 according to example embodiments, since the position of the light source 210 and the lens 220 is adjusted according to the horizontal position HP1 and/or the vertical position VP1 of the object 160, light energy projected (or incident) on the object 160 may be increased even with less power consumption. Accordingly, the accuracy of depth information obtained by the three-dimensional image sensor 100 may be improved, and the power consumed by the light source module 200 may be reduced.

Figure 9:
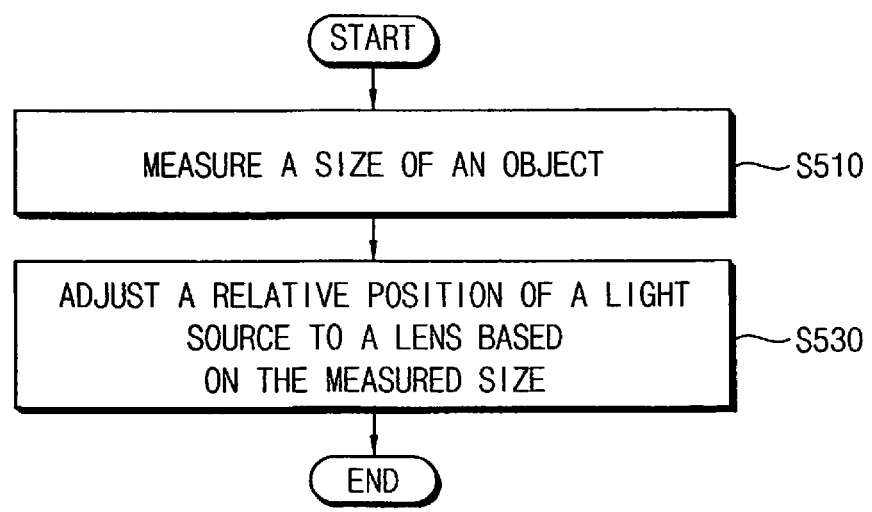
FIG. 9 is a flow chart illustrating a method of operating a three-dimensional image sensor according to example embodiments.
Figure 10:
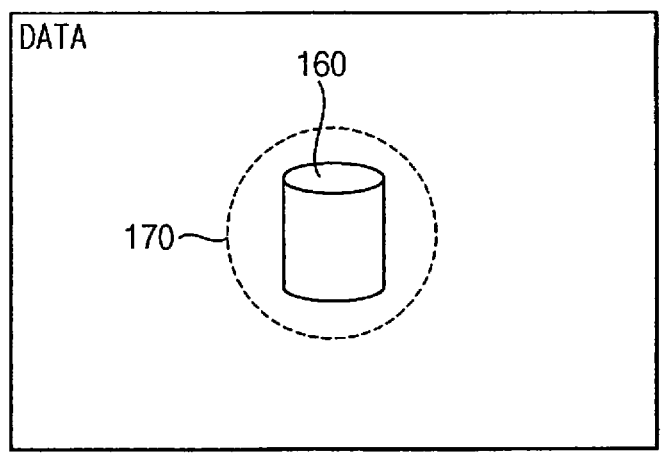
FIG. 10 is a diagram for describing an example of measuring a size of an object according to the method of FIG. 9.

FIG. 9 is a flow chart illustrating a method of operating a three-dimensional image sensor according to example embodiments. FIG. 10 is a diagram for describing an example of measuring a size of an object according to the method of FIG. 9.

Referring to FIGS. 1, 9 and 10, a three-dimensional image sensor 100 measures a size of an object 160 using light TX emitted by a light source module 200 (S510). The light TX emitted by the light source module 200 may be reflected from the object 160 back to the three-dimensional image sensor 100. The received light RX may be converted into data DATA by depth pixels included in a pixel array 110 and an ADC unit 120, and a control unit 150 may measure the size of the object 160 based on the data DATA.

The three-dimensional image sensor 100 adjusts a relative position of the light source 210 to the lens 220 based on the size of the object 160 (S530). According to example embodiments, as illustrated in FIG. 10, the control unit 150 may adjust an emission angle of the light TX so that the emitted light TX is focused on a region 170 corresponding to the size of the object 160. For example, as illustrated in FIGS. 5A and 5B, the control unit 150 may move the light source 210 and/or the lens 220 to adjust any one or two or all of an interval between the light source 210 and the lens 220, a refractive index and a curvature of the lens 220.

As described above, in the method of operating the three-dimensional image sensor 100 according to example embodiments, since the relative position of the light source 210 and the lens 220 and/or the property of the lens 220 is adjusted according to the size of the object 160, light energy projected on the object 160 may be increased even with less power consumption. Accordingly, the accuracy of depth information obtained by the three-dimensional image sensor 100 may be improved, and the power consumed by the light source module 200 may be reduced.

Figure 11:
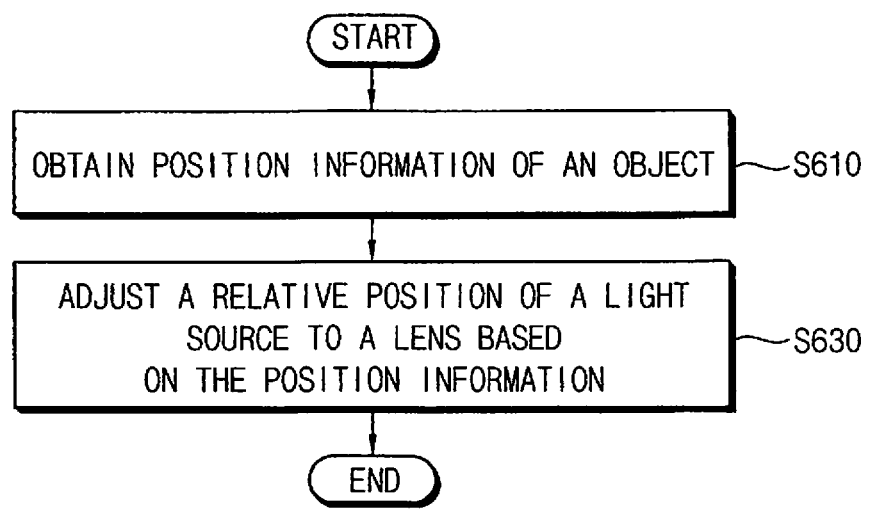
FIG. 11 is a flow chart illustrating a method of operating a three-dimensional image sensor according to example embodiments.

FIG. 11 is a flow chart illustrating a method of operating a three-dimensional image sensor according to example embodiments.

Referring to FIGS. 1 and 11, a three-dimensional image sensor 100 obtains position information of an object 160 using light TX emitted by a light source module 200 (S610). For example, the position information may include a distance of the object 160 from the three-dimensional image sensor 100, a horizontal position of the object 160, a vertical position of the object 160, a size of the object 160, or the like.

The three-dimensional image sensor 100 adjusts a relative position of a light source 210 to a lens 220 based on the position information of the object 160 (S630). For example, the three-dimensional image sensor 100 may adjust an interval between the light source 210 and the lens 220, a refractive index of the lens 220 and/or a curvature of the lens 220 based on the distance of the object 160 from the three-dimensional image sensor 100. According to example embodiments, the three-dimensional image sensor 100 may move the light source 210 and/or the lens 220 in a horizontal direction and/or in a vertical direction based on the horizontal position and the vertical position of the object 160 so that the light source 210, the lens 220 and the object 160 are positioned in a straight line. According to example embodiments, the three-dimensional image sensor 100 may adjust any one, or two or all of the interval between the light source 210 and the lens 220, the refractive index of the lens 220 and the curvature of the lens 220 based on the size of the object 160 so that the light TX emitted by the light source module 200 is focused on a region corresponding to the object 160 of interest.

According to example embodiments, the three-dimensional image sensor 100 may emit the light TX with the maximum amplitude before adjusting the relative position of the light source 210 and the lens 220, and may decrease the amplitude of the light TX after adjusting the relative position. Accordingly, the power consumption by the light source module 200 may be reduced. However, an operation, wherein light TX is initially emitted with minimum amplitude and the amplitude is then maximized, is also possible.

As described above, in the method of operating the three-dimensional image sensor 100 according to example embodiments, since the relative position of the light source 210 and the lens 220 is adjusted based on the position information of the object 160, light energy projected on the object 160 may be increased even with less power consumption. Accordingly, the accuracy of depth information obtained by the three-dimensional image sensor 100 may be improved, and the power consumed by the light source module 200 may be reduced.

Although FIGS. 1 through 11 illustrate an example of the light source module 200 including the light source 210 and the lens 220, in example embodiments may also include, the light source module 200 having a reflector along with or instead of the lens 220.

Figure 12:
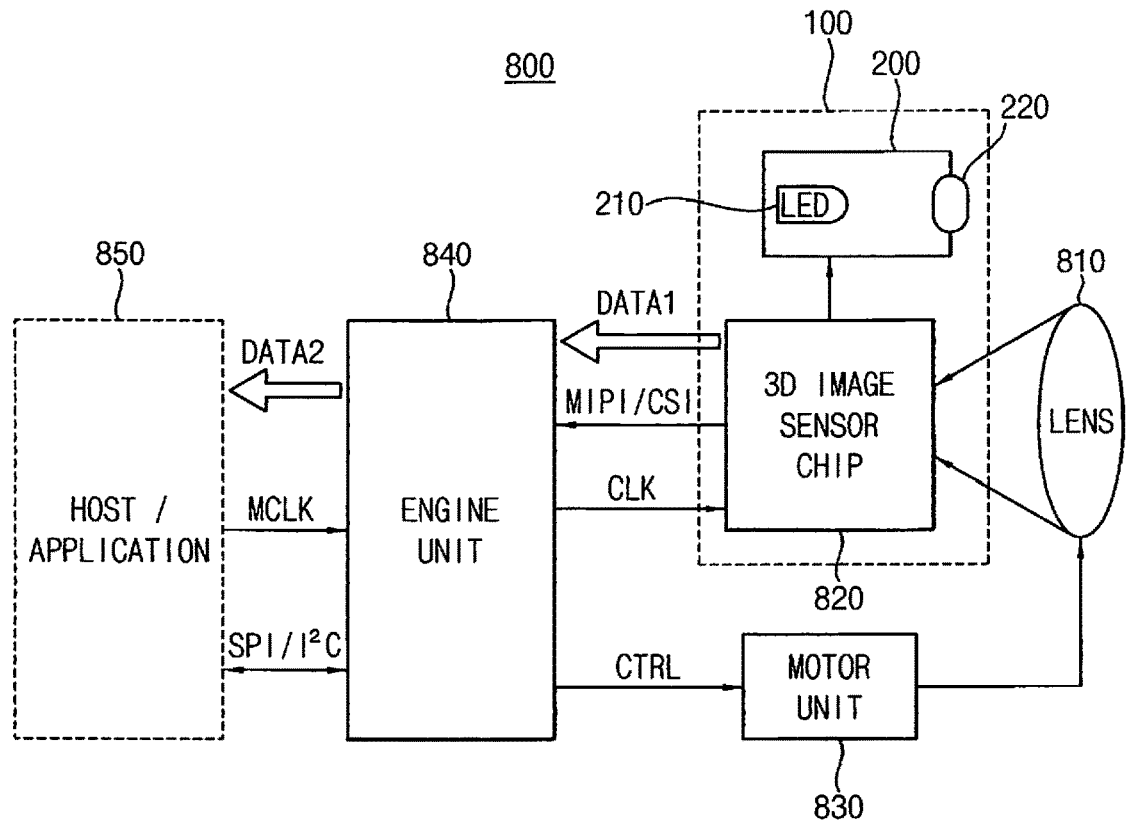
FIG. 12 is a block diagram illustrating a camera including a three-dimensional image sensor according to example embodiments.

FIG. 12 is a block diagram illustrating a camera including a three-dimensional image sensor according to example embodiments.

Referring to FIG. 12, a camera 800 includes a receiving lens 810, a three-dimensional image sensor 100, a motor unit 830 and an engine unit 840. The three-dimensional image sensor 100 may include a three-dimensional image sensor chip 820 and a light source module 200. In example embodiments, the three-dimensional image sensor chip 820 and the light source module 200 may be implemented as separate devices, or may be implemented such that at least one component of the light source module 200 is included in the three-dimensional image sensor chip 820.

The receiving lens 810 may focus incident light on a photo-receiving region (e.g., depth pixels and/or color pixels) of the three-dimensional image sensor chip 820. The three-dimensional image sensor chip 820 may generate data DATA1 including depth information and/or color image information based on the incident light passing through the receiving lens 810. For example, the data DATA1 generated by the three-dimensional image sensor chip 820 may include depth data generated using infrared light or near-infrared light emitted by the light source module 200, and RGB data of a Bayer pattern generated using external visible light. The three-dimensional image sensor chip 820 may provide the data DATA1 to the engine unit 840 in response to a clock signal CLK. In example embodiments, the three-dimensional image sensor chip 820 may interface with the engine unit 840 using a mobile industry processor interface (MIPI) and/or a camera serial interface (CSI).

The motor unit 830 may control the focusing of the lens 810 or may perform shuttering in response to a control signal CTRL received from the engine unit 840. In example embodiments, a relative position of a light source 210 and a lens 220 included in the light source module 200 may be adjusted by the motor unit 830 and/or the three-dimensional image sensor chip 820.

The engine unit 840 may control the three-dimensional image sensor 100 and the motor unit 830. The engine unit 840 may process the data DATA1 received from the three-dimensional image sensor chip 820. For example, the engine unit 840 may generate three-dimensional color data based on the received data DATA1. In example embodiments, the engine unit 840 may generate YUV data including a luminance component, a difference between the luminance component and a blue component, and a difference between the luminance component and a red component based on the RGB data, or may generate compressed data, such as joint photography experts group (JPEG) data. The engine unit 840 may be coupled to a host/application 850, and may provide data DATA2 to the host/application 850 based on a master clock signal MCLK. In example embodiments, the engine unit 840 may interface with the host/application 850 using a serial peripheral interface (SPI) and/or an inter integrated circuit (I2C) interface.

Figure 13:
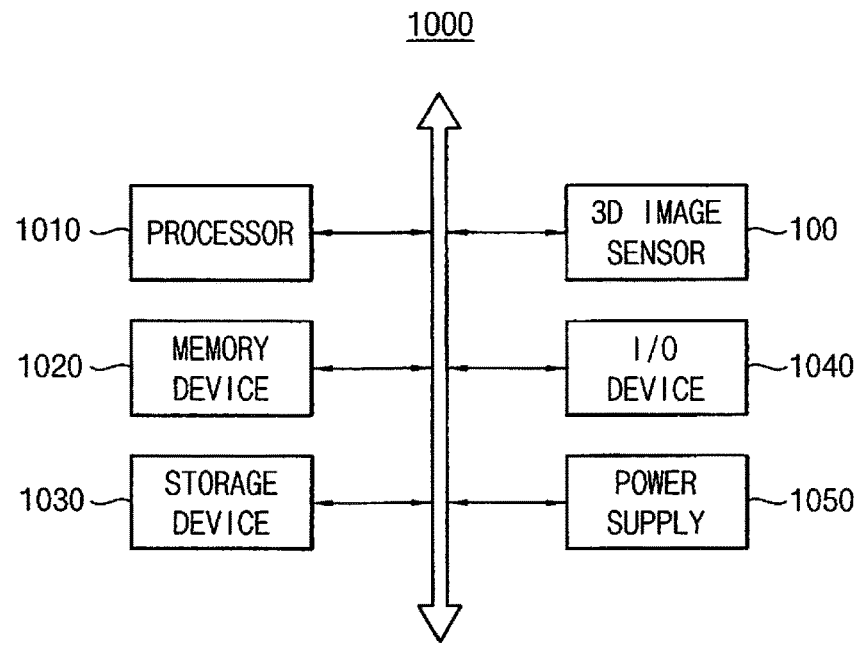
FIG. 13 is a block diagram illustrating a computing system including a three-dimensional image sensor according to example embodiments.

FIG. 13 is a block diagram illustrating a computing system including a three-dimensional image sensor according to example embodiments.

Referring to FIG. 13, a computing system 1000 includes a processor 1010, a memory device 1020, a storage device 1030, an input/output device 1040, a power supply 1050 and/or a three-dimensional image sensor 100. Although it is not illustrated in FIG. 13, the computing system 1000 may further include a port for communicating with electronic devices, such as a video card, a sound card, a memory card, a USB device, etc.

The processor 1010 may perform specific calculations and/or tasks. For example, the processor 1010 may be a microprocessor, a central process unit (CPU), a digital signal processor, or the like. The processor 1010 may communicate with the memory device 1020, the storage device 1030 and the input/output device 1040 via an address bus, a control bus and/or a data bus. The processor 1010 may be coupled to an extension bus, such as a peripheral component interconnect (PCI) bus. The memory device 1020 may store data for operating the computing system 1020. For example, the memory device 1020 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. The storage device 1030 may include a solid state drive, a hard disk drive, a CD-ROM, or the like. The input/output device 1040 may include an input device, such as a keyboard, a mouse, a keypad, etc., and an output device, such as a printer, a display device, or the like. The power supply 1050 may supply power to the computing device 1000.

The three-dimensional image sensor 100 may be coupled to the processor 1010 via the buses or other desired communication links. As described above, three-dimensional image sensor 100 may adjust a projection region of light emitted by a light source module based on position information of an object of interest, thereby improving the accuracy and reducing the power consumption. The three-dimensional image sensor 100 and the processor 1010 may be integrated in one chip, or may be implemented as separate chips.

In example embodiments, the three-dimensional image sensor 100 and/or components of the three-dimensional image sensor 100 may be packaged in various desired forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The computing system 1000 may be any computing system including the three-dimensional image sensor 100. For example, the computing system 1000 may include a digital camera, a mobile phone, a smart phone, a personal digital assistants (PDA), a portable multimedia player (PMP), or the like.

Figure 14:
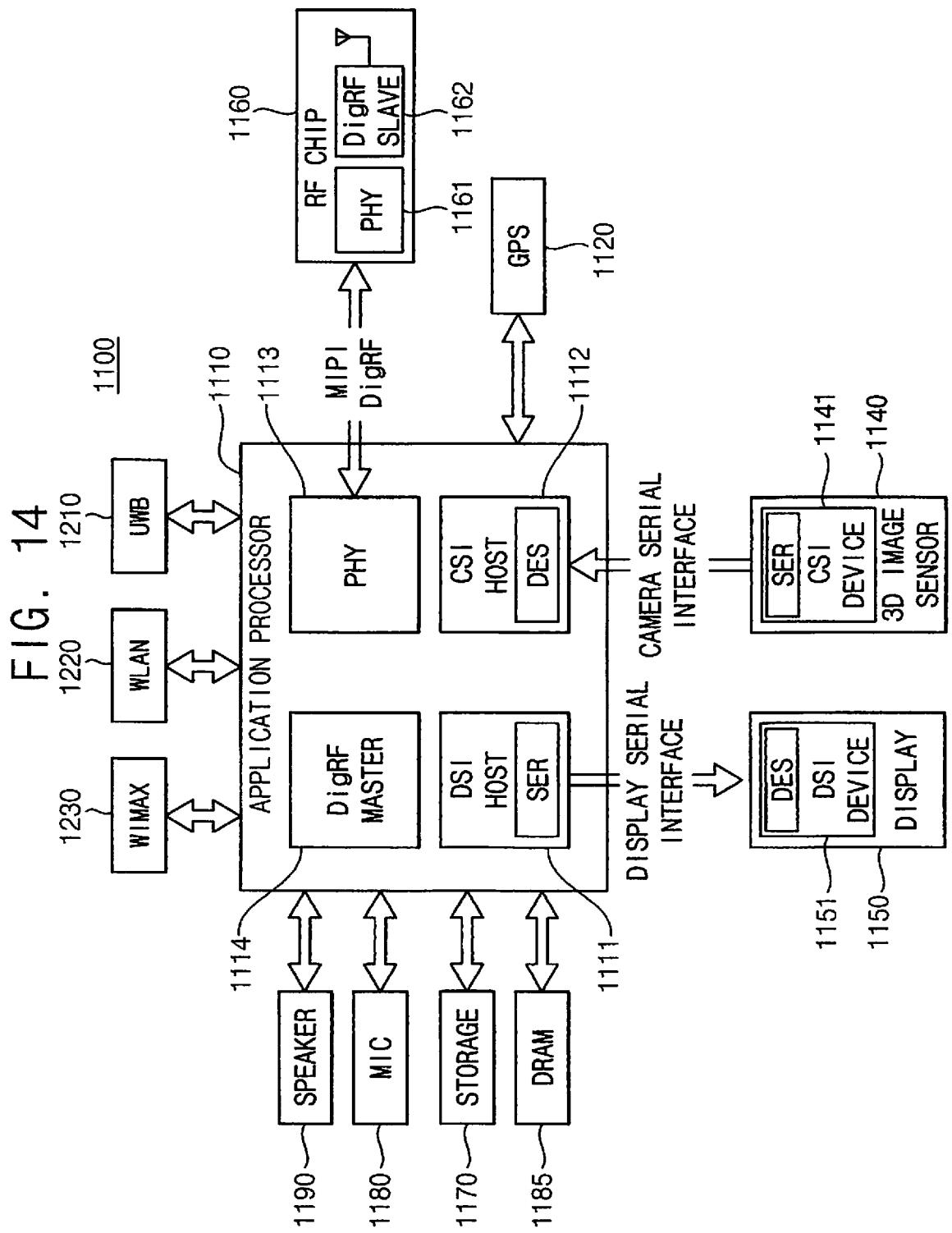
FIG. 14 is a block diagram illustrating an example of an interface used in a computing system of FIG. 13.

FIG. 14 is a block diagram illustrating an example of an interface used in a computing system of FIG. 13.

Referring to FIG. 14, a computing system 1100 may employ or support a MIPI interface, and may include an application processor 1110, a three-dimensional image sensor 1140 and a display device 1050. A CSI host 1112 of the application processor 1110 may perform a serial communication with a CSI device 1141 of the three-dimensional image sensor 1140 using a camera serial interface (CSI). In example embodiments, the CSI host 1112 may include a deserializer DES, and the CSI device 1141 may include a serializer SER. A DSI host 1111 of the application processor 1110 may perform a serial communication with a DSI device 1151 of the display device 1150 using a display serial interface (DSI). In example embodiments, the DSI host 1111 may include a serializer SER, and the DSI device 1151 may include a deserializer DES.

The computing system 1100 may further include a radio frequency (RF) chip 1160. A physical layer PHY 1113 of the application processor 1110 may perform data transfer with a physical layer PHY 1161 of the RF chip 1160 using a MIPI DigRF. The PHY 1113 of the application processor 1110 may interface (or, alternatively communicate) a DigRF MASTER 1114 for controlling the data transfer with the PHY 1161 of the RF chip 1160. The computing system 1100 may further include a global positioning system (GPS) 1120, a storage device 1170, a microphone 1180, a DRAM 1185 and/or a speaker 1190. The computing system 1100 may communicate with external devices using an ultra wideband (UWB) communication 1210, a wireless local area network (WLAN) communication 1220, a worldwide interoperability for microwave access (WIMAX) communication 1230, or the like. However, example embodiments are not limited to configurations or interfaces of the computing systems 1000 and 1100 illustrated in FIGS. 13 and 14.

Example embodiments may be used in any three-dimensional image sensor or any system including the three-dimensional image sensor, such as a computer, a digital camera, a three-dimensional camera, a mobile phone, a personal digital assistant (PDA), a scanner, a navigator, a video phone, a monitoring system, an auto focus system, a tracking system, a motion capture system, an image stabilizing system, or the like.

While example embodiments have been particularly shown and described, it will be understood by one of ordinary skill in the art that variations in form and detail may be made therein without departing from the spirit and scope of the claims.

What is claimed is:

1. A method of operating an image sensor, the method comprising:
   emitting, with a light source module, light from a light source onto an object, the image sensor including the light source module;
   receiving, from the object, light reflected onto the image sensor;
   activating a plurality of depth pixels included in the image sensor in response to receiving the light reflected from the object;
   obtaining, with a control unit, position information of the object using the light emitted by the light source module, the light source module including a light source and a lens, a point on the object being collinear with the light source and the lens, the light being projected, at one time point, on a two-dimensional region in a plane where the object is located, the obtaining including measuring a distance of the object from the image sensor by detecting a time-of-flight of the emitted light;
   obtaining, with the control unit, a horizontal position of the object and a vertical position of the object, the image sensor including the calculation unit;
   calculating, with the control unit, a size of the object based on a distance of the object from the image sensor;
   adjusting an emission angle of the light emitted by the light source module based on the obtained position information, the obtained horizontal position, the obtained vertical position, and the calculated size by adjusting a linear distance between the light source module and the lens,
   increasing an amplitude of the light emitted by the light source module according to an increase in the emission angle of the light; and decreasing an amplitude of the light emitted by the light source module according to a decrease in the emission angle of the light, wherein the adjusting based on the obtained position information decreases the emission angle of the light as the distance of the object from the image sensor increases, wherein the adjusting based on the obtained position information increases the emission angle of the light as the distance of the object from the image sensor decreases, wherein the measuring includes at least twice sampling light reflected from the object, calculating a phase difference between the emitted and reflected light based on the at least two samples, and detecting the time-of-flight of the emitted light, and the control unit is configured to control an interval between the light source and the lens, a relative position of the light source and the lens with respect to each other, a refractive index of the lens, and a curvature of the lens.

2. The method of claim 1, wherein the obtaining the position information of the object comprises:

emitting the light with a desired emission angle from the light source module.

3. The method of claim 2, wherein the adjusting adjusts the emission angle of the light based on the distance of the object from the image sensor.

4. The method of claim 1, wherein the light emitted by the light source module is periodic light, and the method further comprises, extracting four samples of the reflected light at phases corresponding to 90 degrees (A0), 180 degrees (A1), 280 degrees (A2), and 360 degrees (A3), and calculating an offset of the reflected light according to an average of the four samples of the reflected light.

5. The method of claim 4, further comprising:

calculating an amplitude A of the reflected light based on the four samples of the reflected light.

6. The method of claim 5, further comprising:

calculating a phase phi of the reflected light based on the four samples of the reflected light.

7. The method of claim 6, wherein the measuring the distance includes, calculating distances to the object with respect to each of the plurality of depth pixels included in the image sensor.

8. The method of claim 7, further comprising:

providing black-and-white image information about the object based on the calculated amplitude A of the reflected light.

9. The method of claim 6, further comprising:

calculating a plurality of distance values to the object based on a signal output from respective ones of the plurality of depth pixels.

10. The method of claim 9, further comprising:

distinguishing the object from a background image frame based on the respective plurality of distance values.

11. The method of claim 1, wherein the emitting of the light from the light source module includes, emitting light in an infrared spectrum.

12. The method of claim 1, wherein the emitting of the light from the light source module includes, emitting light in a near-infrared spectrum.

13. The method of claim 1, further comprising:

converting analog signals output from the depth pixels into digital data.

14. The method of claim 13, further comprising:

providing the digital data to a control unit, the image sensor including the control unit.

15. The method of claim 14, further comprising:

providing color information associated with the object and depth information associated with the object to a digital signals processing circuit.

16. The method of claim 14, further comprising:

providing color information associated with the object and depth information associated with the object to an external host.

17. The method of claim 1, wherein the calculating the horizontal position and the vertical position includes, measuring a relative position of the object from a center of an image frame, and adjusting the relative position using the obtained distance to generate the horizontal and vertical position of the object.

18. The method of claim 1, wherein the calculating the size of the object includes, measuring an initial size of the object, and adjusting the initial size using the obtained distance to calculate the size of the object.

19. The method of claim 1, further comprising:

providing black-and-white image information based on the plurality of depth pixels; and providing color image information based on a plurality of color pixels.

20. The method of claim 19, wherein the providing black-and-white image information includes, providing the black-and-white image information based on an infrared filter formed on the depth pixels, and wherein the providing the color image information includes, providing the color image information based on a color filter formed on the color pixels.

* * * * *